(12) United States Patent
Huang et al.

(10) Patent No.: US 6,197,912 B1
(45) Date of Patent: Mar. 6, 2001

(54) SILANE ENDCAPPED MOISTURE CURABLE COMPOSITIONS

(75) Inventors: Misty Weiyu Huang, New City; Bruce A. Waldman, Cortlandt Manor, both of NY (US)

(73) Assignee: CK Witco Corporation, Greenwich, CT (US)

( * ) Notice: Subject to any disclaimer, the term of this patent is extended or adjusted under 35 U.S.C. 154(b) by 0 days.

(21) Appl. No.: 09/427,829

(22) Filed: Oct. 27, 1999

Related U.S. Application Data

(63) Continuation-in-part of application No. 09/377,802, filed on Aug. 20, 1999, now abandoned.

(51) Int. Cl.[7] .................................................. C08G 77/04
(52) U.S. Cl. ............................ 528/28; 528/49; 525/453; 525/474; 556/421
(58) Field of Search ....................... 528/49, 28; 525/453, 525/474; 556/421

(56) References Cited

U.S. PATENT DOCUMENTS

| | | | |
|---|---|---|---|
| 3,627,722 | 12/1971 | Seiter | 528/28 |
| 3,632,557 | 1/1972 | Brode et al. | 528/28 |
| 3,979,344 | 9/1976 | Bryant et al. | 428/442 |
| 4,067,844 | 1/1978 | Barron et al. | 528/28 |
| 4,222,925 | 9/1980 | Bryant et al. | 528/49 |
| 4,345,053 | 8/1982 | Rizk et al. | 525/440 |
| 4,374,237 | 2/1983 | Berger et al. | 528/28 |
| 4,474,933 | 10/1984 | Huber et al. | 528/26 |
| 4,625,012 | 11/1986 | Rizk et al. | 528/28 |
| 4,645,816 | 2/1987 | Pohl et al. | 528/28 |
| 5,354,880 | 10/1994 | Pepe et al. | 556/407 |

FOREIGN PATENT DOCUMENTS 676 403 A1   11/1995   (EP) .

Primary Examiner—Rachel Gorr
(74) Attorney, Agent, or Firm—Shirley S. Ma, Esq.

(57) ABSTRACT

Moisture curable polymers having terminal or pendant silyl groups of the formula:

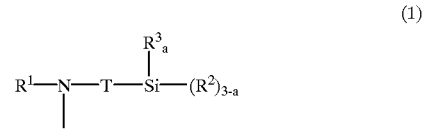

(1)

where $R^1$ represents an alkyl group having 1 to 10 carbon atoms, optionally interupted with one or more ether oxygen atoms, or a group of the formula

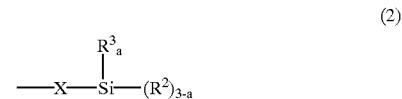

(2)

$R^2$ represents a $C_1$ to $C_6$ alkoxy group or a $C_6$–$C_8$ aryloxy group;
$R^3$ represents an alkyl or an aryl group;
T represents a branched or cyclic alkylene radical of 4 to 10 carbons, which may be optionally interrupted by one or more ether oxygen atoms;
X is an alkylene group of 3–10 carbon atoms, which may be linear, branched or cyclic;
and a is 0, 1 or 2, may be prepared by reacting (A) a compound having at least two isocyanate groups thereon with (B) a silane of formula (3):

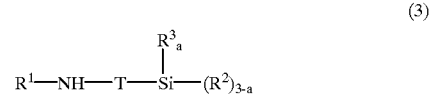

(3)

Moisture cured sealant formulations formulated with the polymers exhibit improved thermal stability, elongation, and tear resistance.

23 Claims, No Drawings

SILANE ENDCAPPED MOISTURE CURABLE COMPOSITIONS

This is a Continuation-in-Part of application Ser. No. 09/377,802 filed Aug. 20, 1999 now abandoned.

BACKGROUND OF THE INVENTION

Urethane prepolymers have been modified in the past to improve or add to their basic properties by end-capping some or all of the isocyanate groups with various organo-functional silanes. Among these methods, U.S. Pat. No. 3,632,557 describes the complete end-capping of conventional polyurethane prepolymers with primary and secondary aliphatic aminosilanes. U.S. Pat. No. 3,979,344 details a room temperature curable silicon terminated organic sealant composition comprising a small quantity of 3-(N-2-aminoethyl)aminopropyltrimethoxysilane to improve the sealant's cure speed. U.S. Pat. No. 4,222,925 describes compositions as is given in U.S. Pat. No. 3,979,344 but which also incorporate a reinforcing carbon black filler. Sealants having improved elongation and flexibility were prepared using silane end-capped polyurethane polymers obtained from silane monomers having at least one dialkoxy group and an organofunctional group with at least one active hydrogen atom in U.S. Pat. No. 4,645,816.

However, polyurethane prepolymers end-capped with primary aminofunctional silanes contain an active hydrogen atom which is capable of further reactions with the isocyanate end groups. This reactivity can lead to undesirable instability of both the polymer and sealant compositions. Several methods use secondary aminofunctional silane endcappers. For example, U.S. Pat. No. 4,374,237 describes the curable isocyanate terminated polyurethane prepolymers at least part of whose terminal isocyanate groups have been reacted with a secondary amine containing silane monomer having two trialkoxy silane groups. U.S. Pat. No. 4,474,933 describes crosslinkable polyurethane resin mixtures that have been capped with various primary and secondary difunctional aminosilane endcappers. Other references of interest relating to silane end-capped urethane prepolymers and sealants are U.S. Pat. No. 3,627,722; U.S. Pat. No. 4,067,844; U.S. Pat. No. 4,625,012; U.S. Pat. No. 4,345,053; U.S. Pat. No. 4,645,816; and U.S. Pat. No. 5,354,880.

In EP 676 403 Al there are described arylaminoisobutylalkyldialkoxy silanes useful as end cappers for isocyanate polymers.

It is an object of the present invention to provide novel silane compositions useful for instance as sealants, coatings, and the like, based upon urethane prepolymers end-capped with certain N-alkyl-aminoalkylsilanes.

BRIEF SUMMARY OF THE INVENTION

One aspect of the present invention is a composition of matter which is a moisture cureable polymer characterized by having a plurality of terminal or pendant groups of the formula:

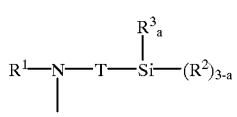

(1)

thereon, where $R^1$ represents an alkyl group having 1 to 10 carbon atoms optionally interupted with one or more ether oxygen atoms, most preferably an ethyl group, or a group of the formula

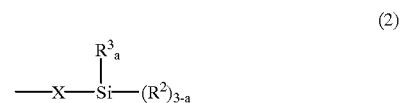

(2)

$R^2$ represents a $C_1$ to $C_6$ alkoxy group or a $C_6$–$C_8$ aryloxy group;

$R^3$ represents an alkyl, preferably having 1 to 6 carbon atoms, or an aryl group, preferably having 6–8 carbon atoms;

T represents a branched or cyclic alkylene radical of 4 to 10 carbons, which may be optionally interrupted by one or more ether oxygen atoms;

X is an alkylene group of 3–10 carbon atoms, which may be linear, branched or cyclic; and a is 0, 1 or 2.

Another aspect of the present invention is a composition of matter which is the product of reacting (A) a compound having at least two isocyanate groups thereon with (B) a silane of formula (3):

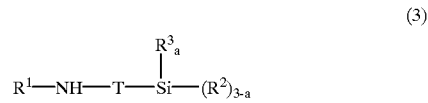

(3)

where T, $R^1$, $R^2$, $R^3$, and a are as previously defined. The isocyanate functional compound may be a prepolymer compound prepared by reacting a polyol component with an excess of difunctional or polyfunctional isocyanate so that said prepolymer contains unreacted isocyanate groups.

Still other aspects of the present invention are curable formulations useful for instance as sealants, containing the aforementioned composition of matter together with a cure catalyst and one or more conventional functional adjuvants selected from the group consisting of fillers, plasticizers, thixotropes, ultraviolet stabilizers, and adhesion promoters.

Yet another aspect of the present invention is the process of making a composition of matter which upon curing exhibits improved thermal stability, elongation, tensile strength and tear resistance, comprising reacting the aforementioned prepolymer (A) with a silane of the aforementioned formula (3).

DETAILED DESCRIPTION OF THE INVENTION

The entire disclosures of all US patents and other published documents and any copending US patent applications mentioned anywhere herein are expressly incorporated herein by reference.

Unless otherwise indicated herein, "alkyl" may be linear, branched or cyclic; "aryl" includes alkaryl groups such as tolyl, and aralkyl groups such as benzyl; and "alkylene" may be linear, branched or cyclic and includes alkylene groups having pendent or internal aryl groups such as 1,4-diethylenephenylene:

or 3-phenyl-1,3-propylene;

Referring to formulae (1) and (3) above, T is exemplified by isobutylene (i.e. 2-methylpropylene: —CH$_2$CH(CH$_3$)CH$_2$—), 2,2-dimethylethylene (i.e. with branching distal from the silicon atom), 1-methylpropylene, 3-methylpropylene, 2,2-dimethylpropylene, 3-methylbutylene, 3,3-dimethylbutylene, 2-ethylhexylene, isopropoxypropylene (i.e. —CH$_2$CH(CH$_3$)—O(CH$_2$)$_3$—), isopropoxyisobutylene (i.e. —CH$_2$CH(CH$_3$)—OCH$_2$CH(CH$_3$)CH$_2$—) and the like. Branching is preferably distal to the carbon atom to which the silicon atom in formulae (1) and (3) is bound. Isobutylene is preferred. T may also be an alkylene group comprising a cyclic hydrocarbon moiety such as a cyclopentylene, 1,4-cyclohexylene, 1,4-diethylenecyclohexylene:

and 1,4-diethylenephenylene:

R$^1$, as an optionally interrupted alkyl group, is exemplified by methyl, ethyl, propoxyethyl, propyl, isopropyl, n-butyl, sec-butyl, t-butyl, hexyl, 2-ethylhexyl, octyl, nonyl, decyl, ethoxymethyl, ethoxyethyl, propoxyethyl, ethoxypropyl, ethoxyethoxypropyl and the like. R$^1$, as a group of formula (2), is exemplified by trimethoxysilylpropyl, triethoxysilylpropyl, 3-trimethoxysilyl-2-methylpropyl, 3-trimethoxysilyl-1-methylpropyl, 3-dimethoxymethylsilylpropyl 2-(4-trimethoxysilylethyl)cyclohexylethyl, and the like.

X is exemplified by 1,2-propylene, 1,3-propylene, 1,4-butylene, 1,5-pentylene, 1,6-hexylene, and the like and by the exemplary T groups previously identified.

R$^2$ is exemplified by methoxy, ethoxy, isopropoxy, n-propoxy, phenoxy, tolyloxy, and the like. Methoxy and ethoxy are preferred.

R$^3$ is exemplified by methyl, ethyl, propyl, isopropyl, butyl, hexyl, phenyl, tolyl, dimethylphenyl, ethylphenyl and the like. Preferably R$^2$ is not present (a=0) or is a methyl group.

Exemplary silanes of formula (3) include:
N-methyl-3-amino-2-methylpropyltrimethoxysilane,
N-ethyl-3-amino-2-methylpropyltrimethoxysilane,
N-ethyl-3-amino-2-methylpropyldiethoxymethylsilane,
N-ethyl-3-amino-2-methylpropyltriethoxysilane,
N-ethyl-3-amino-2-methylpropylmethyldimethoxysilane,
N-butyl-3-amino -2-methylpropyltrimethoxysilane,
3-(N-methyl-2-amino-1-methyl-1-ethoxy)-propyltrimethoxysilane,
N-ethyl-4-amino-3,3-dimethylbutyldimethoxymethylsilane,
N-ethyl-4-amino-3,3-dimethylbutyltrimethoxysilane,
bis-(3-trimethoxysilyl-2-methylpropyl)amine and
N-(3'-trimethoxysilylpropyl)-3-amino-2-methylpropyltrimethoxysilane.

Silanes of formula (3) can be prepared by hydrosilylation of a corresponding secondary amino branched or cyclic alkene with an alkoxyhydridosilane, ot aryloxyhydridosilane. Trialkoxyhydridosilanes are preferred. Suitable reaction conditions are illustrated in the examples below. Alternatively one can react such an alkenylamine with a hydridochlorosilane, and the resulting aminoalkylchlorosilane subsequently esterified to the corrsponding alkoxy or aryloxy silane.

Preparation of Polymers

Isocyanate functional prepolymers having organic and inorganic backbones are well known. Organic backbone polymer systems include acrylics, polyurethanes, polyethers, polyesters, polyolefins and others. Inorganic backbone systems are exemplified by polyorganosiloxanes. Preferred polymers have an organic backbone especially a polyurethane or a polyether. Depending on the application, any such prepolymers may be used in preparing moisture cureable silylated polymers by endcapping with a silane of formula (3). Alternatively, the silanes may be reacted with mono isocyanates which are then used to prepare polymers to yield pendant alkoxy silane functionalities.

The synthesis of typical silane terminated urethane polymers, silylated polyurethanes, and representative formulations prepared therefrom are described in U.S. Pat. Nos. 3,632,557; 4,345,053, and 4,645,816. Isocyanate terminated polyurethane prepolymers useful in the present invention, may be prepared by reacting an excess of organic polyisocyanate with a polyol or a combination of polyols usually in the presence of a catalyst. As used herein, the term "polyisocyanate" means an organic compound having two or more than two isocyanate groups and "polyol" means a compound having two or more hydroxy groups thereon.

Suitable polyisocyanates include any from which polyurethane polymers can be prepared by the customary sequence of reaction with polyol to form a prepolymer. Useful diisocyanates include, for example, 2,4-toluene diisocyanate, 2,6-toluene diisocyanate, 4,4' diphenyl-methanediisocyanate, isophorone diisocyanate, dicyclohexylmethane-4,4'-diisocyanate, various liquid diphenylmethane-diisocyanates containing a mixture of 2,4- and 4,4' isomers, Desmodur® N and the like, and mixtures thereof. A preferred isocyanate functional monomer used in the present invention is the mixture of 2,4- and 4,4' diphenylmethane diisocyanates (MDI) which is available from Bayer under the trade name Mondur® ML.

In producing the isocyanate terminated polyurethane prepolymers of the present invention, polyols are reacted with an organic polyisocyanate. They generally have a molecular weight between 250 and 30,000, more narrowly between about 300 to 16,000. They may be polyether polyols, polyester polyols or other polyol compounds. Suitable polyols include polyoxyalkylene (especially polyoxyethylene, polyoxypropylene, and polyoxybutylene) diols, polyoxyalkylene triols, polytetramethylene glycols, polycaprolactone diols and triols, and the like. Other polyol compounds, including tetraols, hexaols, alkoxylated bisphenols or polyphenols, and various sugars and derivatives thereof may also be used, including pentaerythritol, sorbitol, mannitol and the like. Preferred polyols used in the present invention are polypropylene glycols with equivalent weights between about 500 and 10,000, more narrowly between about 500 and 8,000. Mixtures of polyols of various structures, molecular weights and/or functionalities may also be used.

A catalyst may be used in the preparation of the above mentioned polyurethane prepolymers. Suitable catalysts are dialkyltin dicarboxylates, such as dibutyltin dilaurate and dibutyltin acetate, tertiary amines, the stannous salts of carboxylic acids, such as stannous octoate and stannous acetate, and the like. The preferred catalyst used in the present invention is dibutyltin dilaurate.

To prepare isocyanate terminated polyurethane prepolymers useful in this invention, at least a slight mole excess of the —NCO equivalents (groups) with respect to the hydroxyl (—OH) equivalents (groups) is employed to terminate the polymer chain with isocyanate groups. A preferred molar ratio of the NCO to OH is from about 1.2 to 4.0, and more narrowly between 1.3 and 2.0. The reaction temperature is typically in the range of 60° to 90° C.; the reaction time is about 4 to 8 hours.

Curable polymers of the present invention having pendant or terminal groups of formula (1) may be prepared from the reaction of an endcapper silane of formula (3) with an isocyanate terminated prepolymer such as the isocyanate terminated polyurethanes described above. A slight excess (about 3 to 5%) of the organofunctional silane endcapper should be employed in order to ensure a complete reaction of all the terminal isocyanate groups of the prepolymer. The reaction is conducted preferably in the absence of moisture and at a temperature in the range of 60° to 90° C. The reaction is complete when the percent (%) isocyanate is determined to be zero.

Polymers having terminal or pendant groups of more than one structure within formula (1), for instance having at least one group of formula (1) in which the numeral a is 0 and at least one group of formula (1) in which the numeral a is 2, may be prepared in accordance with the invention using mixtures of different silanes of formula (3), or using sequential reactions of such different silanes.

Formulations

Formulations useful for instance as sealants incorporating the above silane terminated polyurethane polymer can be prepared by thoroughly mixing together the silane terminated polyurethane polymer, a cure catalyst, and optionally one or more conventional functional adjuvants such as crosslinkers, fillers, plasticizers, thixotropes, antioxidants, UV stabilizers, dehydrating agents and/or adhesion promoter(s). Effective mixing can be achieved using a double planetary mixer. Typically, the silane terminated polyurethane polymer, fillers, stabilizers and plasticizer are mixed at 80° C. for 60 to 90 minutes. After cooling to 50° C., the desired silane adhesion promoter, dehydrating agent and cure catalyst are added and the mixture is stirred, typically for an additional 30 minutes under a blanket of nitrogen.

Typical fillers suitable for formulation of the sealants include reinforcing fillers such as fumed silica, precipitated silica, calcium carbonates, carbon black, glass fibers, aluminasilicate, clay, zeolites and similar material. Several commercial grades of carbon black useful in this invention are available, such as "Corax" products (Degussa).

Treated calcium carbonates having particle sizes from 0.07 $\mu$m to 4 $\mu$m are preferred fillers and are available under several trade names, such as: "Ultra Pflex" and "Hi Pflex" from Specialty Minerals; "Winnofil SPM" and "Winnofil SPT" from Zeneca Resins; "Hubercarb 1Qt", "Hubercarb 3Qt" and "Hubercarb W" from Huber and "Kotomite" from ECC. These fillers can be used either alone or in combination. The fillers generally comprise up to 300 parts per 100 parts of the silylated polymer with 80 to 150 parts being the more preferred loading level.

The plasticizers customarily employed in sealants can also be used in the invention to modify the properties and to facilitate use of higher filler levels. Exemplary plasticizers include phthalates, dipropylene and diethylene glycol dibenzoates and mixtures thereof, epoxidized soybean oil and the like. Useful sources of dioctyl and diisodecyl phthalate include those available under the tradenames "Jayflex DOP" and "Jayflex DIDP" from Exxon Chemical. The dibenzoates are available as "Benzoflex 9-88", "Benzoflex 50" and "Benzoflex 400" from Velsicol Chemical Corporation. The soybean oil is available from Union Carbide Corporation as "Flexol EPO". The plasticizer typically comprises up to 100 parts per hundred parts of the silylated polymer with 40 to 80 parts per hundred being preferred.

The sealant formulation can include various thixotropic or anti-sagging agents. This class of additives are typified by various castor waxes, fumed silica, treated clays and polyamides. These additives typically comprise 1 to 10 parts per hundred parts of silylated urethane component with 1 to 6 parts being preferred. Useful thixotropes 25 include those available as: "Aerosil" from Degussa, "Cab-O-Sil" from Cabot, "Castorwax" from CasChem, "Thixatrol" and "Thixcin" from Rheox, and "Disparlon" from King Industries.

UV stabilizers and/or antioxidants can be incorporated into the sealant formulations of this invention in an amount from 0 to 5 parts per hundred parts of silylated urethane polymer with 0.5 to 2 parts being preferred. These materials are available from companies such as Great Lakes and Ciba Specialty Chemicals under the tradenames "Anox 20" and "Uvasil 299 HM/LM" (Great Lakes), and "Irganox 1010," "Irganox 1076," "Tinuvin 770," "Tinuvin 327," "Tinuvin 213" and "Tinuvin 622 LD" (Ciba), respectively.

Various organofunctional silane adhesion promoters are also useful in those formulations of the present invention, such as sealants, in which the ability to adhere to another surface is desired. These materials are typically employed at levels of 0.5 to 5 parts per hundred parts of the silylated urethane polymer with 0.8 to 1.5 parts per hundred parts polymer being preferred. Suitable adhesion promoters include Silquest® A-1110 silane, Silquest® A-1120 silane, Silquest® Y-11012 silane, Silquest A-2120 silane, Silquest A-1170 silane and Silquest A-187 silane, all of which are available from Witco Corporation's OSi Specialties Group. Other adhesion promoters which may be used include 4-amino-3,3-dimethylbutyltrimethoxysilane and 4-amino-3,3-dimethylbutyldimethoxymethylsilane. Ethoxy, and mixed methoxy/ethoxy, versions of all of these silanes may be used as well.

Suitable cure catalysts are the same as those that have been previously described for preparation of the silylated urethane polymers. The catalysts typically compromise 0.01 to 3 parts per hundred parts silylated urethane polymer with 0.01 to 1.0 part per hundred part polymer being preferred.

After mixing, the formulations are cured by exposure to moisture. For example, sealants are typically cured at 23° C. and 50% relative humidity for 3 days and 37° C. and 95% relative humidity for another 4 days.

The invention is illustrated by the following non-limiting examples.

EXAMPLES

Synthesis Examples:

Example 1

Endcapper A: Reaction of N-Ethylmethallylamine and Trimethoxysilane

A one-liter three-neck round bottom flask was equipped with a magnetic stir bar, standard heating mantle, thermocouple, addition funnel, condenser and N2 inlet/bubbler. The flask was charged with 220 g (1.80 moles) of trimethoxysilane and heated to 60° C. at which temperature 34 ppm of Pt [as platinum tris(divinyltetramethyl disiloxane) diplatinum (0)] was added. The solution was further heated to 68° C. and a dropwise addition of 150 g (1.52 moles) of N-ethyl methallylamine was then conducted over a period of 45 minutes. After addition, the contents were heated to 90° C. and maintained at this temperature for 1 hour. The temperature was then increased to 105° C. and held for 4.5 hrs. Upon completion of the reaction, the mixture was cooled to room temperature and 16 g (0.5 moles) of methanol were added and gently heated prior to distillation. Final purification via vacuum distillation yielded 273 g (1.24 moles) of N-ethyl-3-amino-isobutyltrimethoxysilane, i.e. N-ethyl-3-trimethoxysilyl-2-methylpropanamine. The product (b.p. 98–100° C. at 12 mm Hg) was characterized via GC/MS. The isolated yield was 82%.

Example 2

Endcapper B: Reaction of N-Ethyl-methallylamine and Diethoxymethylsilane

With the exception of a distillation head replacing the condenser, the equipment was similar to that of Example 1. The flask was charged with 381 g (2.84 moles) of methyldiethoxysilane and 50 ppm Pt [as platinum tris (divinyltetramethyl disiloxane)diplatinum (0)]. The contents were heated to 90° C. and 260 g (2.63 moles) of N-ethylmethallylamine was added over 30 minutes via addition funnel. Immediately after addition was completed, the contents were heated to 110° C. and held for one hour. The product was isolated by vacuum distillation to give 485 g (2.08 moles) of N-ethyl-3-amino-isobutyldiethoxymethylsilane, i.e. N-ethyl-(3-diethoxymethylsilyl)-2-methylpropanamine. The product (b.p. 88–90° C. at 27 mm Hg) was characterized via GC/MS. The isolated yield was 79%.

Example 3

Preparation of Isocyanate Prepolymer

To a 1000 ml reaction vessel equipped with a mechanical stirrer, a heating mantle, a thermometer, a condenser and a dry nitrogen inlet was charged 62.85 g of liquid diphenylmethane diisocyanate (0.251 mole) and 669.9 g of polypropylene glycol (PPG) (0.167 mole) with an average molecular weight of 4000 (NCO:OH=1.5).The reaction kettle was warmed to 50° C. and dibutyltin dilaurate catalyst (60 ppm Sn) was added. The reaction temperature was increased to 65–70° C. The reaction was maintained at this temperature until the percent (%) free NCO reached the capping point calculated as about 0.9%. The titration to determine the % free NCO was conducted according to the ASTM D 2572 test specification.

Example 4

Preparation of the Silane Terminated Polyurethane Polymers

Polymer 1

While the NCO-terminated polyurethane prepolymer prepared as in Example 3 was still in the reaction vessel, 38.69 g of Endcapper A from Example 1 (0.175 mole) was added and mixed. The reaction continued at 65° C. for two hours and was then cooled to room temperature to produce the silane-terminated polyurethane polymer 1. The NCO content was determined to be 0.0% by titration per ASTM D 2572.

Polymer 2

The same procedures described for polymer 1 were employed to form an endcapped polyurethane prepolymer, except that 40.80 g of endcapper B was used instead of endcapper A.

Polymer 3 (Comparative)

The same procedures described for polymer 1 were employed to form an endcapped polyurethane prepolymer, except that 46.78 g of N-phenyl-3-aminoisobutylmethyldimethoxysilane was used instead of endcapper A.

Polymer 4 (Comparative)

The same procedures described for polymer 1 were employed to form an endcapped polyurethane prepolymer, except that 44.84 g of N-phenyl-3-aminopropyltrimethoxysilane was used instead of endcapper A.

Sealant Preparations:

Example 5

A sealant composition was prepared which comprised 100 parts of the silane terminated polyurethane polymer 1 of Example 4, 100 parts of calcium carbonate, 6 parts of fumed silica, 40 parts plasticizer, and a minor amount of light stabilizers. These ingredients were charged to a one quart Ross double planetary mixer. The mixture was heated to 80° C., under vacuum, for two hours. The mixture was then cooled to 35° C. and 1.5 parts of adhesion promoter and 0.063 parts of dibutyltin dilaurate were added and mixed for an additional hour. The mixer was then evacuated to a pressure of <5 mm Hg for five minutes to afford Sealant L.

The physical properties of cured sealants are determined by tensile, tear and elongation tests using American Society for Testing and Materials (ASTM) Methods D 412 and D 624. The performance of Sealant L is listed in Table I.

TABLE I

| Sealant L properties | |
|---|---|
| Tensile Strength | 246 psi |
| Young's Modulus | 210 psi |
| % Elongation | 165% |
| Tear Resistance | 26 lbs/in |
| Shore A Hardness | 50 |
| Adhesion: | |
| Aluminum (WET) | 12 lbs/in, 100% cohesive failure |
| Glass (wet) | 14 lbs/in, 75% cohesive failure |

Example 6

The polymers 1–4, described in Example 4 were each blended with 1 wt % of dibutyltin dilaurate and cured in an environmental chamber at 23° C. and 50% RH for three days, then in a regular oven at 50° C. for four days. The cured products were tested as follows:

Yellowing Test:

The polymers, after curing as described above, were placed in an oven at 80° C. for a week, the change of color before and after the accelerated aging was determined by a Minolta Chroma Meter C210.

TABLE 2

Yellowing Index of Cured Polymers
(Control Index 1.97)

| Polymer | Yellow index | |
|---|---|---|
| | Before Aging | After Aging |
| 1 | 3.33 | 10.23 |
| 2 | 5.71 | 16.04 |
| 3 | 4.78 | 56.86 |
| 4 | 4.02 | 23.28 |

Example 7

Formulations as described in Table 3, were prepared as follows. Into a one quart double planetary mixer was placed one of the silated polymers described in Example 4, Silquest® A-171 Silane, DIDP, Ultra-pflex, Hi-pflex, Ti-920 and $SiO_2$. To ensure good shelf-stability all fillers were pre-dried for a minimum of 24 hours at 120° C. prior to use. The blend was mixed at 40 rpm for 60 minutes at 80° C. under nitrogen. After cooling to 50° C., the organosilane component (i.e. 2-(acetylthio)-1-trimethoxysilane), and Sul 11A were added and the mixture was stirred for an additional 30 minutes under full vacuum. The finished sealant was removed and packaged in an aluminum foil lined cartridge.

TABLE 3

Polyurethane Sealant Formulations

| Components | Weight (g) |
|---|---|
| Polymer | 250 |
| DIDP | 100 |
| Silquest ® A-171 Silane | 5 |
| Ultra-pfex | 150 |
| Hi-pfex | 100 |
| Tinuvin ® 213 | 2.5 |
| Tinuvin" 622LD | 2.5 |
| Ti-902 | 7.5 |
| $SiO_2$ | 15 |
| Organosilane | 3.75 |
| Sul 11A | 0.5 |

Sealants prepared in this manner were designated as follows:

Sealant 1 Polymer was polymer 1
Sealant 2 Polymer was polymer 2
Comparative A Polymer was polymer 3
Comparative B Polymer was polymer 4.

The sealants were cured and adhesion properties were tested in the manner described below. Test results are reported in Table 4.

Adhesion-in-peel Test:

Glass substrates were thoroughly cleaned using isopropanol, detergent (0.1% solution) and deionized water rinse. The cleaned substrates were allowed to air dry prior to use.

The adhesion-in-peel testing was conducted in accordance to the ASTM C 794 procedure. The experimental sealant was spread over ⅔ of the substrate coupon to a depth of approximately 1/16 inch. The sealant was then covered with a 30 mesh aluminum screen which was covered with an additional 1/16 inch layer of sealant. Specimens were cured for 21 days according the following schedule: 7 days at 23° C. and 50% RH; 7 days at 38° C.; and 95% RH; 7 days at 23° C. and 50% RH.

The cured specimens were placed in a QUV oven with glass substrates faced to UV light for 350 hours. The QUV was operated in a schedule of four hours at high humidity and 60° C. with UV light on, followed by four hours heat off and UV light off.

To measure wet adhesion performance, the treated samples were then immersed into water for 7 days prior to test. The 180° peel strength was measured on an Instron® test machine after the period of immersion.

To measure dry adhesion performance the peel strength was measured without immersing in water.

TABLE 4

Adhesion of Formulated Sealants after Aging UV Through Glass

| | Dry Adhesion (lbs/in) | | Wet Adhesion (lbs/in) | |
|---|---|---|---|---|
| Sealant | Before UV | After UV | Before UV | After UV |
| Sealant 1 | 6 | 9 | 14 | 12 |
| Sealant 2 | 37 | 36 | 33 | 36 |
| Comparative A | 22 | 8 | 14 | 5 |
| Comparative B | * | * | * | * |

*Comparative B sealant couldn't be fully cured even after 3 weeks at 95% RH at 38° C.

Example 8

Polymer 5 (Comparative)

The same procedures described in Example 4 for Polymer 1 were used to prepare an endcapped polyurethane polymer except that 41.32 g of N-butyl-3-aminopropyltrimethoxysilane was used instead of endcapper A.

Polymer 6 (Invention)

N-butyl-4-amino-3,3-dimethylbutyltrimethoxysilane was prepared as follows:

In a 1 liter 3-necked flask equipped with a magnetic stirrer, heating mantle thermometers and condenser was added 664.1 g (3 moles) of 4-amino-3,3-dimethylbutyltrimethoxysilane and 69.4 g (0.75 mole) of 1-chlorobutane. With stirring, the flask contents were slowly heated to 125° C. and maintained at that temperature for a total of 13 hours. A gas chromatograph of a sample of the flask contents at that point indicated all of the chlorobutane had been consumed in the reaction with the aminofunctional silane. The flask was cooled to room temperature and 162 g of a 25% solution of sodium methoxide in methanol (0.75 mole of sodium methoxide) was added drop-wise by means of an addition funnel. After stirring for 30 minutes the flask contents were pressure filtered and distilled, yielding after removal of methanol and excess 4-amino-3,3-dimethylbutyltrimethoxysilane, 160.7 g of N-butyl-4-amino-3,3-dimethylbutyltrimethoxysilane (bp 90–94° C. at 1 mm Hg, 58% yield). The structure was confirmed by gc-mass spectroscopy and $^1H$ and $^{13}C$ nmr spectroscopy.

The same procedures described in Example 4 for Polymer 1 were then used to prepare an endcapped polyurethane polymer except that 49.06 g of the N-butyl-4-amino-3,3-dimethylbutyltrimethoxysilane was used instead of endcapper A.

Sealants

Comparative C sealant and Sealant 3 were prepared as in Example 7 using polymers 5 and 6, respectively. Yellow index of the cured polymers was determined as in Example 6 and adhesion of the sealants after UV aging was determined as in Example 7. Results are shown in Tables 6 and 7.

TABLE 6

Yellowing Index of Cured Polymers
(Control Index 1.97)

| Polymer | Yellow index | |
|---|---|---|
| | Before Aging | After Aging |
| 5 | 3.14 | 7.08 |
| 6 | 2.60 | 6.12 |

TABLE 7

Adhesion of Formulated Sealants after Aging UV Through Glass

| Sealant | Dry Adhesion (lbs/in) | | Wet Adhesion (lbs/in) | |
|---|---|---|---|---|
| | Before UV | After UV | Before UV | After UV |
| Sealant 3 | 7.6 | 11.3 | 1.05 | 15.2 |
| Comparative C | 4.6 | 8.7 | 7.3 | 7.6 |

The foregoing examples demonstrate improved lower yellowing and better adhesion properties after UV aging of the inventive formulations.

The above Examples and disclosure are intended to be illustrative and not exhaustive. These examples and description will suggest many variations and alternatives to one of ordinary skill in this art. All these alternatives and variations are intended to be included within the scope of the attached claims. Moreover, all possible alternative dependent combinations of the features recited in the dependent claims, whether written in multiple dependent form or not, should be considered to be within the scope of the invention. Those familiar with the art may recognize other equivalents to the specific embodiments described herein which equivalents are also intended to be encompassed by the claims attached hereto. It should also be understood that, in addition to those combinations recited in the dependent claims, all other possible combinations of the features of the dependent claims are considered to be specific aspects of the invention.

What is claimed is:

1. A moisture cureable polymer having a plurality of terminal or pendant groups of the formula:

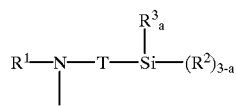
(1)

thereon, where
$R^1$ represents an alkyl group having 1 to 10 carbon atoms, optionally interupted with one or more ether oxygen atoms, or a group of the formula

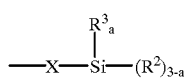
(2)

$R^2$ represents a $C_1$ to $C_6$ alkoxy group or a $C_6$–$C_8$ aryloxy group;
$R^3$ represents an alkyl or an aryl group;
T represents a branched or cyclic alkylene radical of 4 to 10 carbons, which may be optionally interrupted by one or more ether oxygen atoms;
X is an alkylene group of 3–10 carbon atoms, which may be linear, branched or cyclic; and
a is 0, 1 or 2.

2. A polymer as in claim 1 wherein T is isobutylene, 2,2-dimethylethylene, 1-methylpropylene, 3-methylpropylene, 2,2-dimethylpropylene, 3-methylbutylene, 3,3-dimethylbutylene, isopropoxypropylene, isopropoxyisobutylene, 2-ethylhexylene, cyclopentylene, 1,4-cyclohexylene, 1,4-diethylenecyclohexylene:

or 1,4-diethylenephenylene:

3. A polymer as in claim 2 wherein $R^1$ ethyl, $R^2$ is methoxy, a is 0 or 1 and $R^3$ is methyl.

4. A polymer as in claim 1 wherein $R^1$ is methyl, ethyl, propoxyethyl, propyl, isopropyl, n-butyl, sec-butyl, t-butyl, hexyl, 2-ethylhexyl, octyl, nonyl, decyl, ethoxymethyl, ethoxyethyl, propoxyethyl, ethoxypropyl or ethoxyethoxypropyl.

5. A polymer as in claim 1 wherein $R^2$ is methoxy, ethoxy, isopropoxy, n-propoxy, phenoxy, or tolyloxy.

6. A polymer as in claim 1 wherein a is 1 or 2 and $R^3$ is methyl, ethyl, propyl, isopropyl, butyl, hexyl, phenyl, tolyl, dimethylphenyl or ethylphenyl.

7. A polymer as in claim 1 wherein a is 0.

8. A polymer as in claim 1 wherein $R^1$ is a group of formula (2) and X is 1,2-propylene, 1,3-propylene, 1,4-butylene, 1,5-pentylene, 1,6-hexylene, isobutylene, 2,2-dimethylethylene, 1-methylpropylene, 3-methylpropylene, 2,2-dimethylpropylene, 3-methylbutylene, 3,3-dimethylbutylene, isopropoxypropylene, isopropoxyisobutylene, 2-ethylhexylene, cyclopentylene, 1,4-cyclohexylene, 1,4-diethylenecyclohexylene:

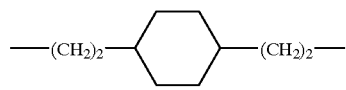

or 1,4-diethylenephenylene:

9. A composition comprising the product of reacting (A) a compound having at least two isocyanate groups thereon with (B) a silane of formula (3):

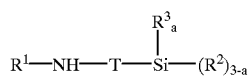

(3)

where

R¹ represents an alkyl group having 1 to 10 carbon atoms, optionally interupted with one or more ether oxygen atoms, or a group of the formula

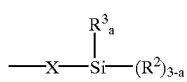

(2)

R² represents a $C_1$ to $C_6$ alkoxy group or a $C_6$–$C_8$ aryloxy group;

R³ represents an alkyl or an aryl group;

T represents a branched or cyclic alkylene radical of 4 to 10 carbons, which may be optionally interrupted by one or more ether oxygen atoms;

X is an alkylene group of 3–10 carbon atoms, which may be linear, branched or cyclic; and a is 0, 1 or 2.

10. A composition as in claim 9 wherein T is isobutylene, 2,2-dimethylethylene, 1-methylpropylene, 3-methylpropylene, 2,2-dimethylpropylene, 3-methylbutylene, 3,3-dimethylbutylene, isopropoxypropylene, isopropoxyisobutylene, 2-ethylhexylene ,cyclopentylene, 1,4-cyclohexylene, 1,4-diethylenecyclohexylene:

or 1,4-diethylenephenylene:

11. A composition as in claim 10 wherein R¹ ethyl, R² is methoxy, a is 0 or 1 and R³ is methyl.

12. A composition as in claim 9 wherein R¹ is methyl, ethyl, propoxyethyl, propyl, isopropyl, n-butyl, sec-butyl, t-butyl, hexyl, 2-ethylhexyl, octyl, nonyl, decyl, ethoxymethyl, ethoxyethyl, propoxyethyl, ethoxypropyl or ethoxyethoxypropyl.

13. A composition as in claim 9 wherein R² is methoxy, ethoxy, isopropoxy, n-propoxy, phenoxy or tolyloxy.

14. A composition as in claim 9 wherein a is 1 or 2 and R³ is methyl, ethyl, propyl, isopropyl, butyl, hexyl, phenyl, tolyl, dimethylphenyl or ethylphenyl.

15. A composition as in claim 9 wherein a is 0.

16. A composition as in claim 9 wherein isocyanate functional compound is a polymeric compound having a backbone selected from the group consisting of polyacrylics, polyurethanes, polyethers, polyesters, polyolefins and polyorganosiloxanes.

17. A composition as in claim 9 wherein said silane of formula (3) is selected from the group consisting of N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxy silane, N-ethyl-3-amino-2-methylpropylmethyldimethoxysilane, N-butyl-3-amino-2-methylpropyltrimethoxysilane, 3 (N-methyl-2-amino-1-methyl-1-ethoxy)-propyltrimethoxysilane, N-ethyl-4-amino-3,3-dimethylbutyldimethoxymethylsilane, N-ethyl-4-amino-3,3-dimethylbutyltrimethoxysilane, bis-(3-trimethoxysilyl-2-methylpropyl)amine and N-(3'-trimethoxysilylpropyl)-3-amino-2-methylpropyltrimethoxysilane.

18. A composition as in claim 9 wherein R¹ is a group of formula (2) and X is 1,2-propylene, 1,3-propylene, 1,4-butylene, 1,5-pentylene, 1,6-hexylene, isobutylene, 2,2-dimethylethylene, 1-methylpropylene, 3-methylpropylene, 2,2-dimethylpropylene, 3-methylbutylene, 3,3-dimethylbutylene, isopropoxypropylene, isopropoxyisobutylene, 2-ethylhexylene, cyclopentylene, 1,4-cyclohexylene, 1,4-diethylenecyclohexylene:

or 1,4-diethylenephenylene:

19. A composition as in claim 9 further comprising a moisture cure catalyst.

20. A composition as in claim 19 further comprising at least one member of the group consisting of fillers, plasticizers, thixotropes, ultraviolet stabilizers, and adhesion promoters.

21. A sealing method comprising applying a composition as in claim 19 between two substrates and allowing the applied composition to be exposed to ambient moisture.

22. A process of making a moisture cureable prepolymer comprising:

providing a prepolymer (A) having at least two isocyanate reaction groups thereon, and reacting the prepolymer (A) with a silane of formula (3):

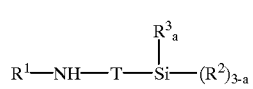

(3)

where

R¹ represents an alkyl group having 1 to 10 carbon atoms, optionally interupted with one or more ether oxygen atoms, or a group of the formula

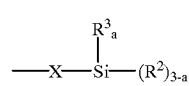

(2)

R² represents a $C_1$ to $C_6$ alkoxy group or a $C_6$–$C_8$ aryloxy group;

$R^3$ represents an alkyl or an aryl group;

T represents a branched or cyclic alkylene radical of 4 to 10 carbons, which may be optionally interrupted by one or more ether oxygen atoms;

X is an alkylene group of 3–10 carbon atoms, which may be linear, branched or cyclic; and a is 0, 1 or 2.

23. A process as in claim 20 wherein said prepolymer (A) is provided as a reaction product of a polyol and a polyisocyanate.

* * * * *